United States Patent

Czapski et al.

[11] Patent Number: 5,472,260
[45] Date of Patent: Dec. 5, 1995

[54] INTEGRATED CHILD SEAT MODULE

[75] Inventors: Richard J. Czapski, Livonia; Neville G. D'Souza, Troy; Rodney L. Lloyd, Walled Lake; Matthew E. Dukatz, Bloomfield Hills; Steven J. Furr, Canton; Fred C. Kresky, Rochester Hills; Jeffrey T. Lambert, Northville; George S. Popa, Troy; Ronald S. Zarowitz, West Bloomfield; M. Jeffry Corkins, Milford, all of Mich.

[73] Assignees: Atoma International, Inc., Newmarket, Canada; Chrysler Corporation, Auburn Hills, Mich.

[21] Appl. No.: 287,278

[22] Filed: Aug. 8, 1994

Related U.S. Application Data

[63] Continuation of Ser. No. 882,610, May 13, 1992, abandoned.

[51] Int. Cl.[6] .................................................. A47C 13/00
[52] U.S. Cl. ...................... 297/112; 297/219.12; 297/238; 297/467; 297/DIG. 6
[58] Field of Search ........................... 297/112–114, 117, 297/238, 254–256, 467, 468, DIG. 6, 219.1, 219.12, 228, 228.13, 283.1, 411.46, 440.11, 488; 5/471, 922

[56] References Cited

U.S. PATENT DOCUMENTS

| 2,584,482 | 2/1952 | Mast et al. |
| 2,966,201 | 12/1960 | Strahler. |
| 3,446,531 | 5/1969 | Froelich ............................ 5/922 X |
| 3,729,752 | 5/1973 | Huggins ............................ 5/922 X |
| 3,828,377 | 8/1974 | Eary, Sr. ............................ 5/922 X |
| 4,040,664 | 8/1977 | Tanaka et al. .................... 297/467 |
| 4,540,216 | 9/1985 | Hassel, Sr. ....................... 297/238 |
| 4,596,420 | 6/1986 | Vaidya ............................. 297/233 |
| 4,681,367 | 7/1987 | Timmers ........................ 297/238 X |
| 4,685,741 | 8/1987 | Tsuge et al. ..................... 297/467 |
| 4,690,455 | 9/1987 | Bailey et al. .................... 297/238 |
| 4,756,573 | 7/1988 | Simin et al. ................... 297/238 X |
| 4,880,277 | 11/1989 | Takahashi et al. ............... 297/467 |
| 4,900,086 | 2/1990 | Steward ....................... 297/112 X |
| 4,900,087 | 2/1990 | Crisp ............................. 297/238 |
| 4,910,818 | 3/1990 | Grabill .......................... 5/922 X |
| 4,943,112 | 7/1990 | Law .............................. 297/238 |
| 4,986,600 | 1/1991 | LeBlanc et al. ................. 297/238 |
| 5,039,169 | 8/1991 | Bougher et al. ............... 297/467 X |
| 5,106,158 | 4/1992 | Dukatz et al. ................. 297/112 X |
| 5,121,938 | 6/1992 | Gross et al. ............... 297/DIG. 6 X |
| 5,135,285 | 8/1992 | Dukatz et al. ................. 297/112 X |
| 5,163,195 | 11/1992 | Hill .............................. 5/922 X |
| 5,224,756 | 7/1993 | Dukatz et al. ................. 297/238 |

FOREIGN PATENT DOCUMENTS

| 2581194 | 3/1988 | European Pat. Off. ............. 297/238 |
| 2720954 | 12/1977 | Germany. |
| 2825329 | 12/1979 | Germany ......................... 297/238 |
| 3445353 | 6/1985 | Germany ......................... 297/238 |
| 483941 | 2/1970 | Switzerland ....................... 5/922 |
| 2023415 | 1/1990 | United Kingdom. |

OTHER PUBLICATIONS 27 still pictures of a video tape showing the integrated child seat designated "Atoma Integrated Child Seat"—Shot #1 through Shot #27, respectively.
Copy of Information Disclosure Statement signed by Jeff Lambert dated Sep. 6, 1994.

*Primary Examiner*—Steven N. Meyers
*Assistant Examiner*—Suzanne L. Dino
*Attorney, Agent, or Firm*—Cushman, Darby & Cushman

[57] ABSTRACT

A child seat module integrated with a rear vehicle seat, and including fold-down lower and upper segments, interconnected by a flexible and detachable hinge, and a plastic back panel mounted against the back frame of the bench seat. A plastic seat pad support platform is mounted on the inner surface of the lower segment. A pad having seat and back segments is removably mounted on the platform and against the back panel. A safety belt system is operably included in the module. The interconnected lower and upper segments are adapted to being folded down to form, with the platform and pad, a child seat cushion and leg support. Alternatively, the leg support may be removed for a child whose size is such that use of the leg support would be uncomfortable.

31 Claims, 8 Drawing Sheets

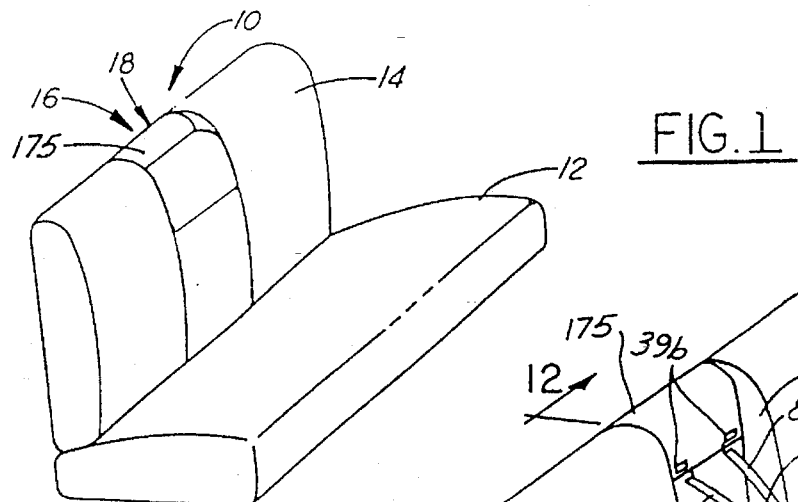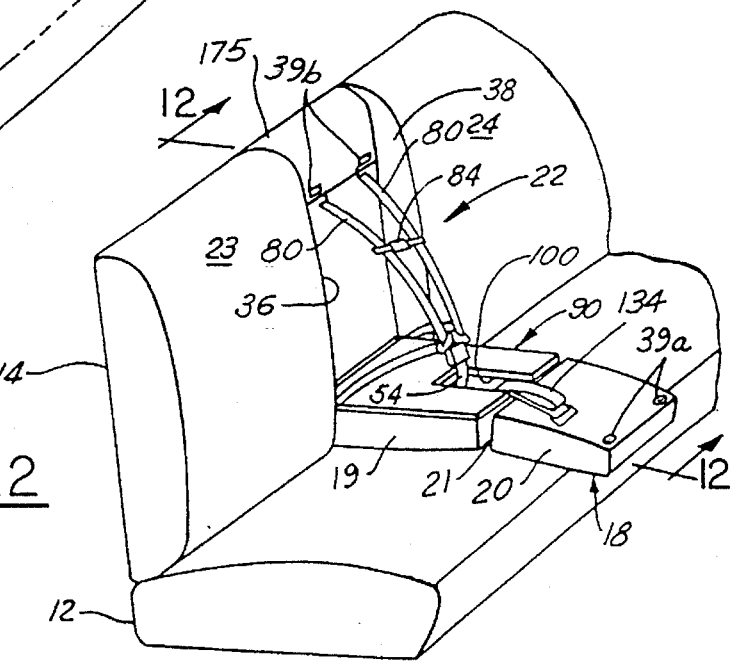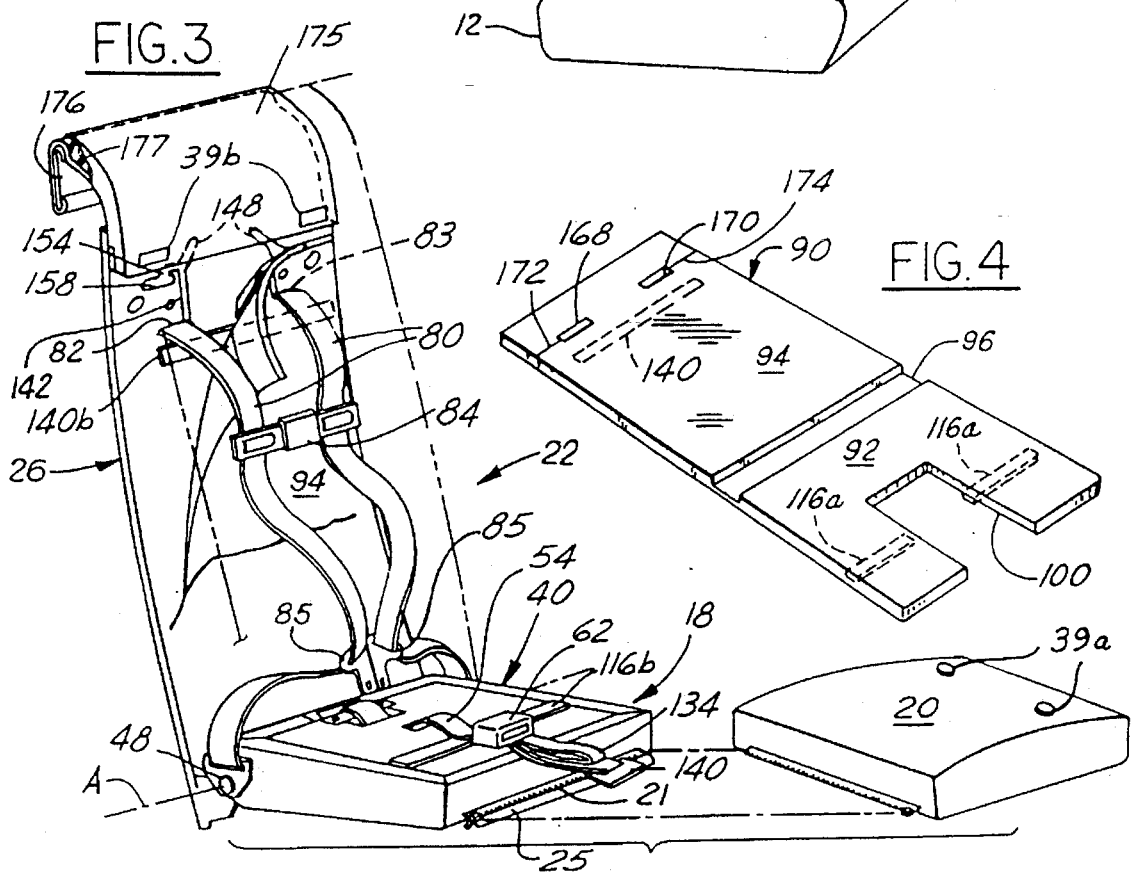

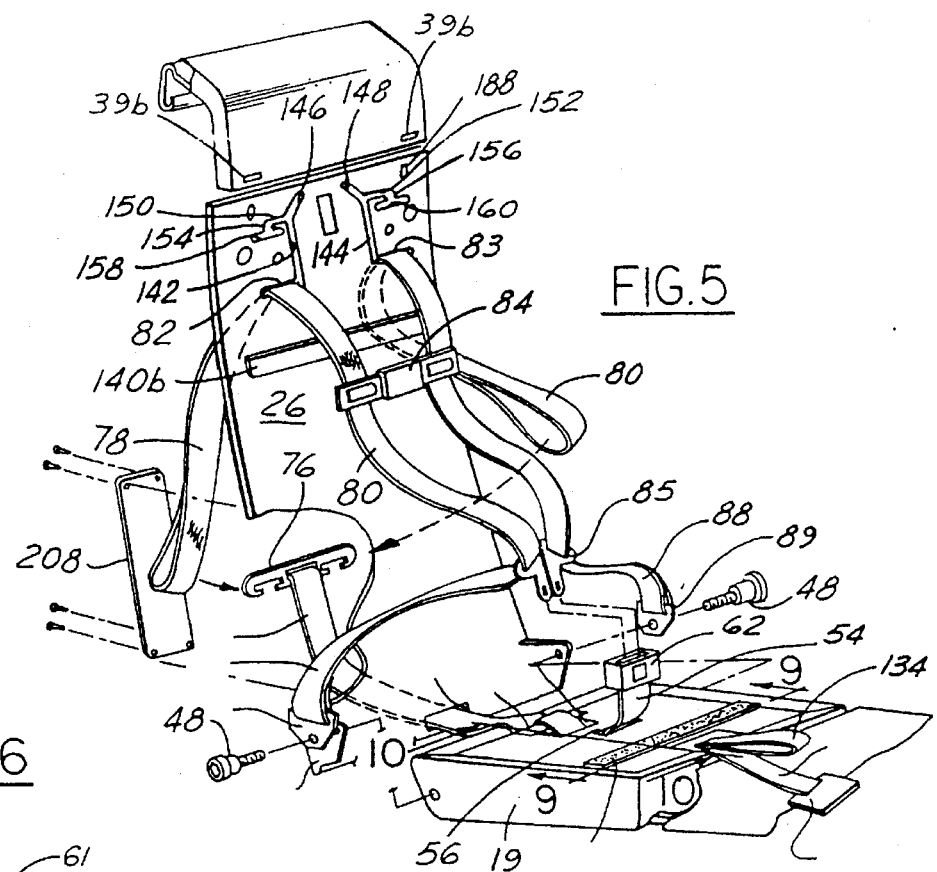
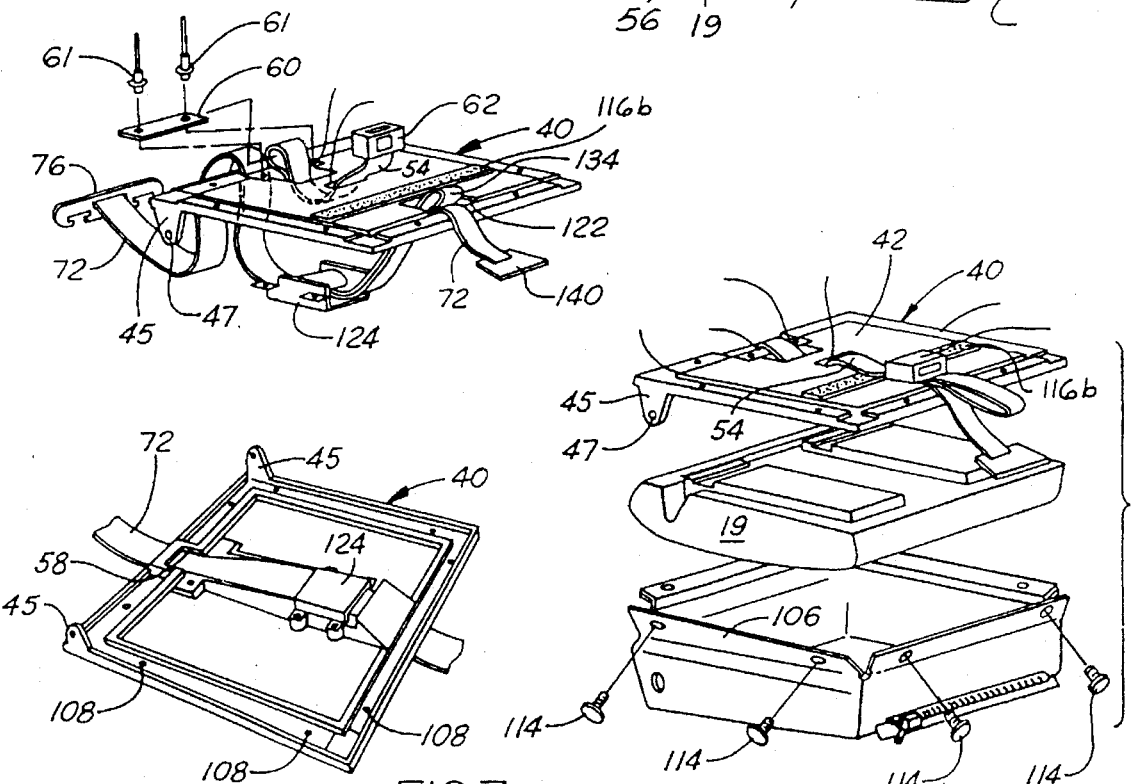

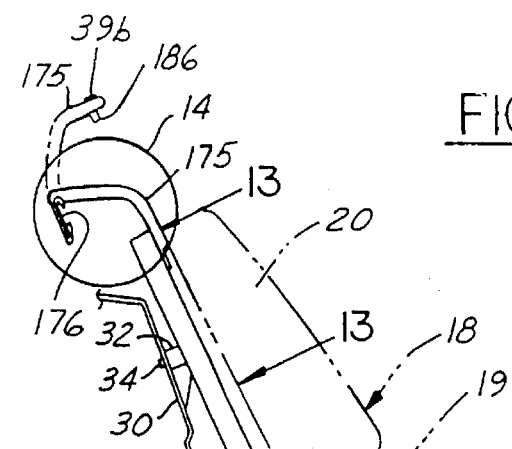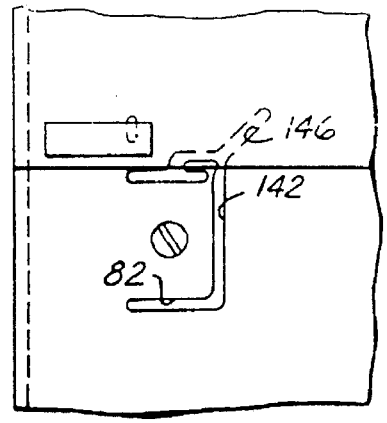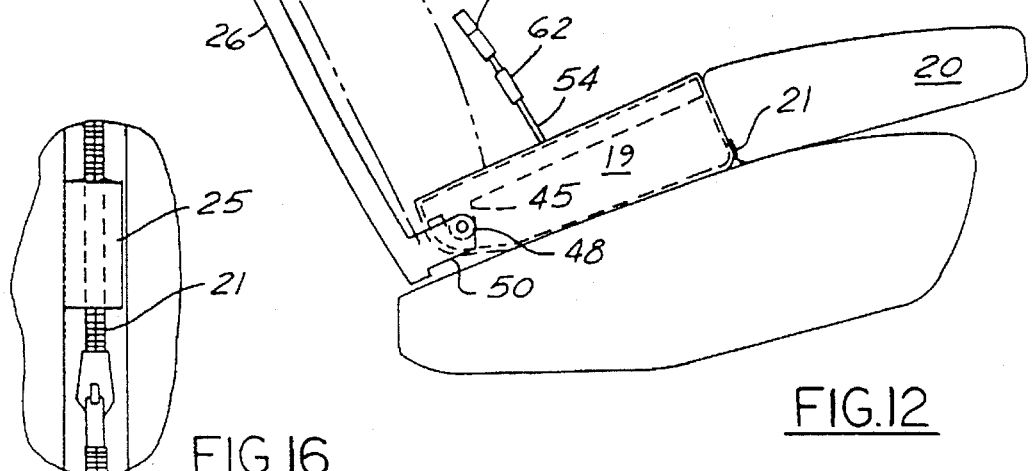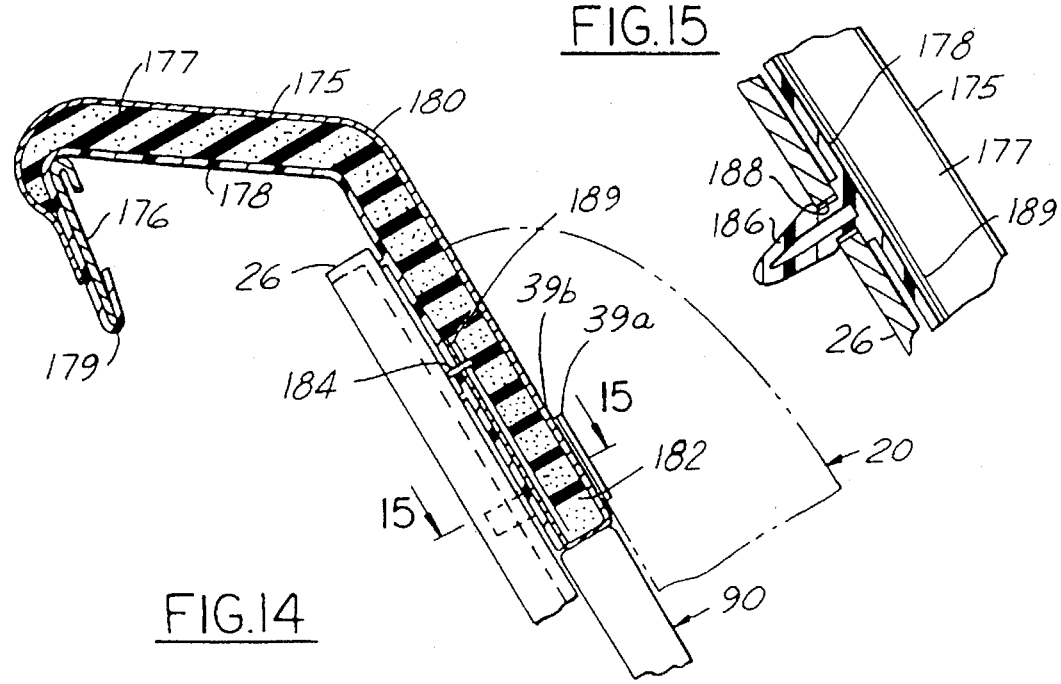

INTEGRATED CHILD SEAT MODULE

This is a continuation of application Ser. No. 07/882,610, filed May 13, 1992, now abandoned.

TECHNICAL FIELD OF INVENTION

This invention relates to vehicle seats and more particularly to vehicle seats integrated so as to provide an adult seat in an adult seat mode and a child's seat in a child seat mode.

BACKGROUND OF THE INVENTION

The type of integrated vehicle seat herein contemplated is the type disclosed in commonly assigned copending U.S. application Ser. No. 07/699,375, filed May 14, 1991, entitled "Integrated Child Seat for Vehicle", a continuation of which issued Jul. 6, 1993, as U.S. Pat. No. 5,224,756.

As a lead up to the '756 patent subject matter, certain integrated child seats were made known to the public as prior art. These integrated child seats were constructed to include a vehicle seat comprising a frame assembly for securement within a vehicle including a seat frame assembly and a seat back frame assembly operatively connected with the seat frame assembly so as to be capable of being disposed in a fixed operative position with respect to the seat frame assembly. A seat cushion was carried by the seat frame assembly in a position to enable an adult occupant of the vehicle to sit thereon in an operative position. Side cushions were carried by the seat back frame assembly in positions to be engaged by opposite sides of the back of an adult seat occupant sitting on the seat cushion in the operative position with the seat back frame assembly in the fixed operative position. The side cushions were spaced apart a distance sufficient to define a child receiving space therebetween of a size to enable a child to be disposed therebetween. A plurality of cushion assemblies were mounted on the frame assembly including a movable cushion assembly mounted on the frame assembly for movement between (1) an adult mode position wherein the movable cushion assembly is disposed within the space between the side cushions and provides adult back cushions for engaging the back of an adult seat occupant sitting on the seat cushion, and (2) a child mode position wherein the movable cushion assembly extends from the space between the side cushions to provide a cushioned child's seat extending from the bottom of the space in overlying relation to the seat cushion and the plurality of cushion assemblies provides a cushioned child's seat back extending upwardly from the cushioned child's seat within the space between the side cushions, and a cushioned child's head support above the cushioned child's seat back. A child's seat belt assembly was disposed in operative relation with the seat back frame assembly and extended forwardly of the cushioned child's seat back for extension over the shoulders of a child sitting on the cushioned child's seat. The movable cushion assembly included a rigid seat structure and a structural connection between the rigid seat structure and the seat back frame assembly enabling the movable cushion assembly to be moved between the adult mode and the child mode positions. The rigid seat structure provided a rigid anchor point for the child's seat belt assembly between the legs of a child sitting on the cushioned child's seat.

Moreover, the plurality of cushion assemblies of the vehicle seat included a removable cushion pad assembly including a back section detachably fixed to the seat back support assembly forwardly thereof between the side cushions to provide therewith the cushioned child's seat back and a seat section hingedly connected with the seat back section detachably fixed to the movable cushion assembly of the vehicle seat to provide therewith the cushioned child's seat.

In addition, certain variations in the integrated child seat of the '756 patent were disclosed in U.S. Pat. Nos. 5,135,285 and 5,106,158, which patents are owned by one of the joint owners of the present application.

BRIEF SUMMARY OF THE PRESENT INVENTION

The present application has for its object the provision of various improvements in the integrated child seats of the '756, '285 and '158 patents which render the integrated child seat particularly suited to be embodied in the middle of the back seat of a family sedan although many of the improvements of the present invention can be utilized in an integrated child seat embodied in any vehicle.

In accordance with the principles of the present invention, the above object can be achieved by providing the following improvement. As one of the plurality of cushion assemblies, there is provided a cushion assembly in the form of a bolster element connected with the movable cushion assembly so as to be moved together with the movable cushion assembly. The bolster element is constructed and arranged with respect to the movable cushion assembly so as to (1) extend above the movable cushion assembly between the side cushions to provide a part of the adult back support when the movable cushion assembly is in the adult mode position thereof and (2) extend forwardly from the movable cushion assembly in overlying supported relation to the seat cushion assembly when the movable cushion assembly is in the child mode position to provide a leg support for a small child sitting on the cushioned child's seat. The bolster element is connected with the movable cushion assembly by a separable slide fastener assembly constructed and arranged to be moved between a connecting position interconnecting the bolster element with the movable cushion assembly and a separable position enabling the bolster element to be selectively removed from the movable cushion assembly.

In accordance with the principles of the present invention, the above object can also be achieved by providing the following improvement. In the removable cushion pad assembly, there is provided cloth material on the opposite side of the seat section of the removable cushion pad assembly having a pile-like outer surface extending substantially throughout the opposite side of the seat section providing loops detachably engageable by the one or more hook fasteners.

In accordance with the principles of the present invention, the above object can also be achieved by providing the following improvement. In the rigid back panel, there is provided a number of slots constructed and arranged to enable the pair of shoulder belts of the child's seat belt assembly to be conveniently moved into a plurality of vertically spaced positions with respect to the child's seat back to selectively accommodate a relatively small child or a relatively large child by simply manually grasping the shoulder belts extending forwardly of the cushioned child's seat back and moving them selectively into one of the plurality of vertically spaced positions. The plurality of slots includes two horizontally spaced and generally horizontally aligned pairs of vertically spaced belt receiving restraint slots formed in the rigid back panel and a transfer slot extending between the restraint slots of each pair so as to define a cantilevered portion in the rigid back panel between the associated pair of restraint slots. The seat back support structure includes a rigid bracket connected directly with each cantilevered portion, each of the brackets being constructed and arranged to provide support from the seat back support structure directly to the cantilevered portion connected therewith while allowing the associated shoulder belt to be selectively moved within the associated transfer slot between the associated pair of restraint slots.

In accordance with the principles of the present invention, the above object can also be achieved by providing the following improvement. In the rigid back panel, there is provided a number of slots constructed and arranged to enable the pair of shoulder belts of the child's seat belt assembly to be conveniently moved into a plurality of vertically spaced positions with respect to the child's seat back to selectively accommodate a relatively small child or a relatively large child by simply manually grasping the shoulder belts extending forwardly of the cushioned child's seat back and moving them selectively into one of the plurality of vertically spaced positions. The number of slots includes two horizontally spaced and generally horizontally aligned pairs of vertically spaced belt receiving restraint slots formed in the rigid back panel and a transfer slot associated with each pair of restraint slots. An upper restraint slot of each pair of restraint slots has one end of the transfer slot associated therewith disposed in communicating relation therewith between the ends thereof. Each transfer slot extends upwardly from one end thereof and laterally beyond one of the ends of the associated upper restraint slot and then generally downwardly beyond the associated upper restraint slot in laterally spaced relation to the associated upper restraint slot into communicating relation at an opposite end thereof with a lower restraint slot of the associated pair of restraint slots.

In accordance with the principles of the present invention, the above object can also be achieved by providing the following improvement. As one of the plurality of cushion assemblies, there is provided a head support cushion assembly which is detachably fixedly connected at a lower portion thereof with the upper portion of the rigid back panel by detachable fasteners carried by the head support cushion assembly and detachably connected with the rigid back panel. An upper portion of the head support cushion assembly has a C-shaped clamp connected therewith and with a cross member forming a part of the seat back support structure.

These and other objects and advantages will become more apparent when reference is made to the following drawings and the accompanying description.

BRIEF DESCRIPTION OF THE DRAWINGS

FIG. 1 is a perspective view of a vehicle seat and back embodying the inventive integrated child seat module in its stored position;

FIG. 2 is a fragmentary perspective view of the seat with the inventive integrated child seat module opened up into its in-use configuration;

FIG. 3 is an enlarged perspective and partially exploded view of the child seat module portion of FIG. 2;

FIG. 4 is an enlarged perspective view of a pad adapted to being mounted on the child seat module back panel and seat support pan of FIG. 3;

FIG. 5 is a perspective view of the child seat module and a five-point safety harness which may be used therewith;

FIG. 6 is an exploded, perspective view of the child seat module support platform together with a portion of a five-point safety harness;

FIG. 7 is a perspective view of the underside of the support pan of FIG. 6;

FIG. 8 is a fragmentary, exploded, perspective view of the child seat bottom portion;

FIG. 12 is an enlarged cross-sectional view taken along the plane of the line 12—12 of FIG. 2, and looking in the direction of the arrows;

FIG. 13 is a fragmentary view taken along the plane of the line 13—13 of FIG. 12, and looking in the direction of the arrows;

FIG. 14 is an enlarged view of a portion of the FIG. 12 structure;

FIG. 15 is a cross-sectional view taken along the plane of the line 15—15 of FIG. 14, and looking in the direction of the arrows;

FIG. 16 is an enlarged, fragmentary view taken along the plane of the line 16—16 of FIG. 12, and looking in the direction of the arrows;

BEST MODE OF CARRYING OUT THE INVENTION

Figure 11:
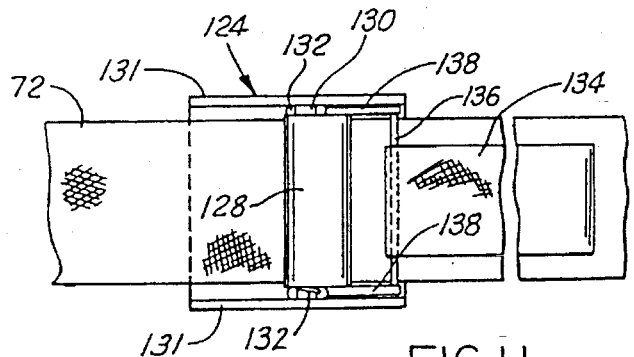
FIG. 11 is an enlarged cross-sectional view taken along the plane of the line 11—11 of FIG. 10, and looking in the direction of the arrows.

Referring now to the drawings in greater detail, FIG. 1 illustrates a vehicle bench seat 10 having a seat cushion assembly 12 and a seat backrest assembly 14. Either one or two side-by-side toddler or child seat modules 16, integrated with the backrest assembly 14, provides a retractable folddown, articulated seat back section 18 adapted for swinging movement in and out of a recess provided in the backrest assembly 14. As best seen in FIGS. 2 and 11, the articulated seat back section 18 includes a first movable cushion assembly or bolster segment 19 and a second movable cushion assembly or bolster segment 20 which are articulated at their outer adjacent opposed edges by a suitable flexible and detachable hinge 21. The detachable hinge 21 may include suitable separable fastener means, such as a slide fastener (FIG. 23) or a zipper for detaching the second bolster segment 20. The zipper may be covered by a flap 25 (FIGS. 12 and 16). The first cushion segment 19 has one side adapted to serve as a back support in an adult seating mode and its other side as a seat bottom in a child seating mode. The second bolster segment 20 has one side adapted to serve as a upper back support in an adult seating mode and its other side as a leg support in a child seating mode.

With reference to FIG. 2, the articulated seat back section 18 may be pivoted downwardly from the backrest 14 about a transverse pivot axis "A" (FIG. 3) adjacent the first cushion segment 19 lower rear end thereof, to form a modular child seat 22 (FIG. 2), while leaving adjacent backrest sections 23 and 24 of the seat backrest 14 intact.

Figure 17:
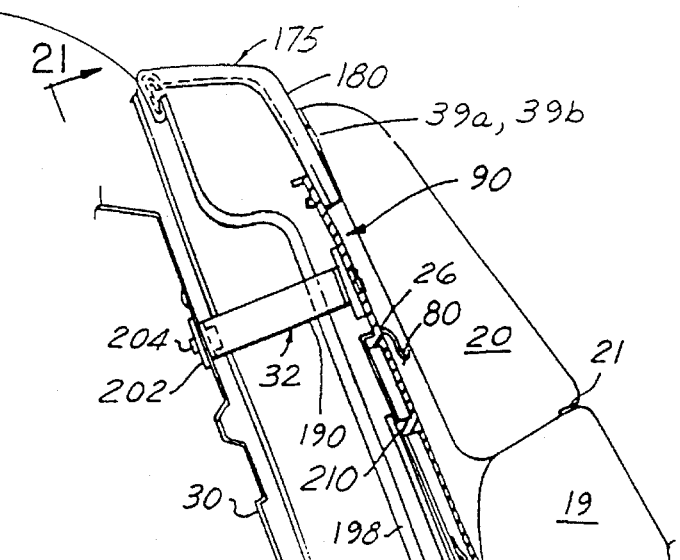
FIG. 17 is a side view, in partial cross section of a vehicle seat structure embodying the invention.
Figure 20:
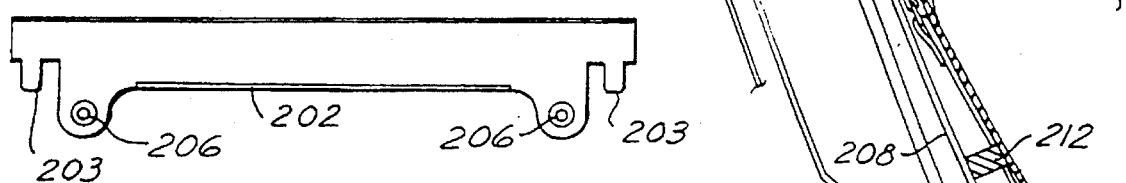
FIG. 20 is a plan view of a portion of the FIGS. 17 and 21 structure.

A back panel 26, formed of suitable structural plastic material, such as glass reinforced polypropylene for example, is secured to seat support means, such as a back wall 30 (FIGS. 12, 18 and 19), by suitable bracket means 32, as will be explained. The bottom end portion of the back panel 26 is secured to the front legs of a pair of substantially Z-shaped seat back 27 brackets (FIGS. 17 and 18) (one adjacent each lower corner of the back panel) by fasteners 28. The brackets 27, in turn, are secured in any suitable manner, such as by rivets or welding, to the front side of respective vertically oriented straps 29. The upper end portions of the straps 29 are secured in any suitable manner, such as by welding, to the back side of a J-shaped lower cross bar 34. The straps 29 are adjacent a vehicle floor pan 35 (FIG. 17). An adult seat belt 33a is secured to a clip 33b which, in turn, is secured by a fastener 33c to each strap 29.

The modular child seat assembly 22 is shown in FIG. 3 and includes the articulated seat back section 18 together with the back panel 26. As an initial step to forming the child seat of FIG. 2, the articulated seat back section 18 is withdrawn from the backrest 14. The articulated seat back section 18 is moved into its child supporting in-use FIG. 2 position by folding down the seat back section 18 from a generally rectangular shaped backrest recess defined by the child seat back panel 26 and a pair of rearwardly extending, recess side walls 36 and 38. The side walls 36 and 38 are formed by the inboard opposed sides of the respective backrest side cushions or sections 23 and 24.

Figure 9:
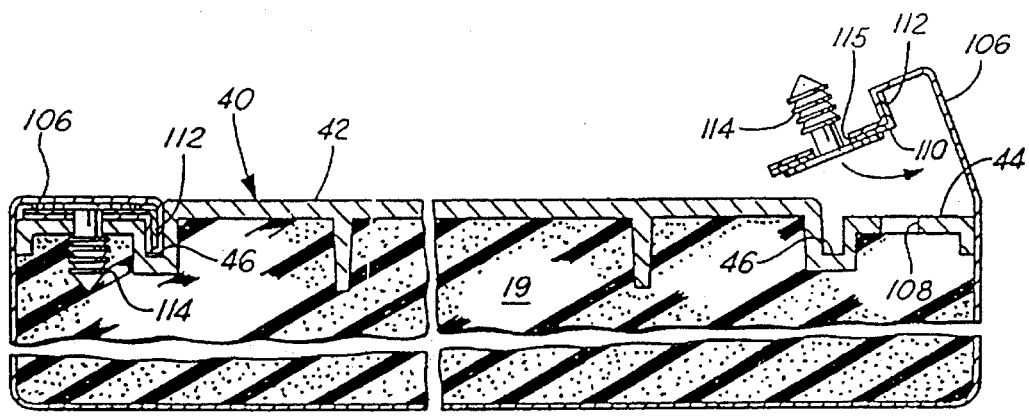
FIG. 9 is an enlarged cross-sectional view taken along the plane of the line 9—9 of FIG. 5, and looking in the direction of the arrows.

With reference to FIG. 8, the back support first cushion segment or child seat bottom 19 includes a rectangular seat pad support platform 40, formed of suitable structural plastic material. As best seen in FIG. 9, the support platform 40 has a central planar portion 42 bordered by a peripheral downwardly offset frame-like ledge portion 44 extending therearound. An endless trough or slot 46 is formed in the top surface of the platform 40 located a predetermined distance inside the outer perimeter thereof, providing a continuous boundary between the central portion 42 and the ledge portion 44, for a purpose to be described.

Figure 10:
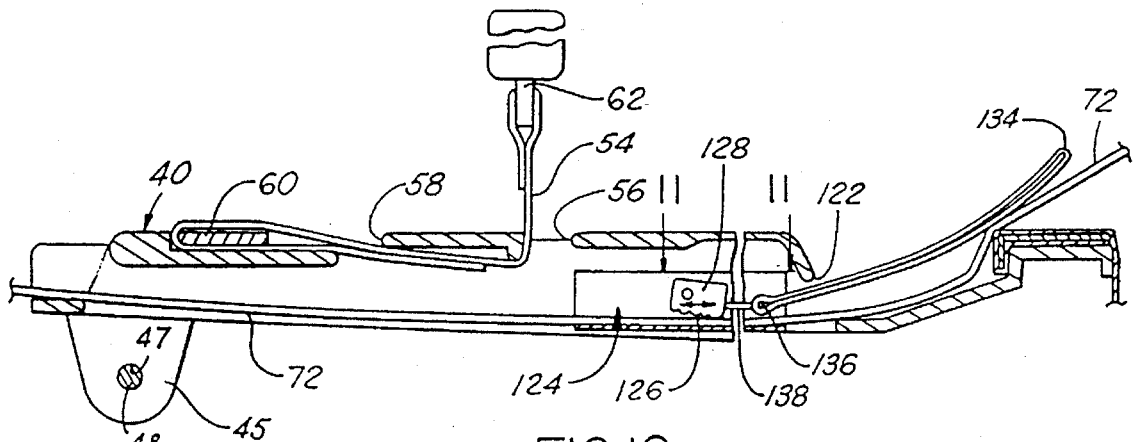
FIG. 10 is a side elevational view taken along the plane of the line 10—10 of FIG. 5, and looking in the direction of the arrow, with a portion thereof in an opened-up condition.

As seen in FIGS. 6, 8 and 10, a pair of perpendicularly extending mounting flanges 45 are formed adjacent the rear corners of the plastic support pan 40 with axially aligned openings 47 formed therein. The openings 47 are adapted to having suitable fasteners 48 (FIG. 10) extended therethrough to pivotally secure the platform 40 to suitable mounting brackets 50 (FIG. 12) fixedly secured to extend from the module back panel 26.

A crotch belt 54 extends longitudinally beneath the seat pad support platform 40, and thence upwardly through openings 56 and 58 (FIG. 6) formed therein, to be secured at the rear end thereof by a suitable mounting bracket or plate 60. The bracket 60 is secured to the platform 40 by suitable fasteners 61 (FIG. 6). A conventional seat belt buckle 62 is secured to the exposed forward end of the belt 54.

As shown in FIG. 5, a single adjust belt 72 extends through a slotted opening 74 formed in the back panel 26 and is connected to a safety harness including a T-bar 76 and twin shoulder belts 78 and 80 extending through respective horizontally disposed restraint slots 82 and 83 in the back panel 26 and thence through a releasably interconnected guide member 84 and slotted ends of a pair of opposite hand connector members 85. The latter are adapted to be releasably connected to the buckle 62. The extensions 87 and 88 of the respective belts 78 and 80 are secured by brackets 89 to the mounting flanges 45. The extensions 87 and 88 serve to mount over the child's thighs.

A removable cushion pad assembly 90 (FIG. 4) having a suitable sheet cover formed from flexible material such as vinyl (FIG. 4), includes respective seat and back segments 92 and 94 connected by a flexible hinge 96 and is removably mounted against the support platform 40 and back panel 26, as shown in FIG. 3. A rectangular opening 100 is formed in the seat segment 92 for mounting around the crotch belt 54 out of the plastic seat support platform 40, and the upper edge 102 of the back segment 94 fits against the back panel 26 up to a point just above the openings 82 and 83. As shown in FIGS. 3 and 4, a strip of Velcro 140a, or other suitable hook or loop tape strips, is mounted on the back side of the pad 90, adapted to engage a mating Velcro or other suitable strip 140b mounted on the back panel 26 to retain the pad 90 in its upright position.

Figure 28:
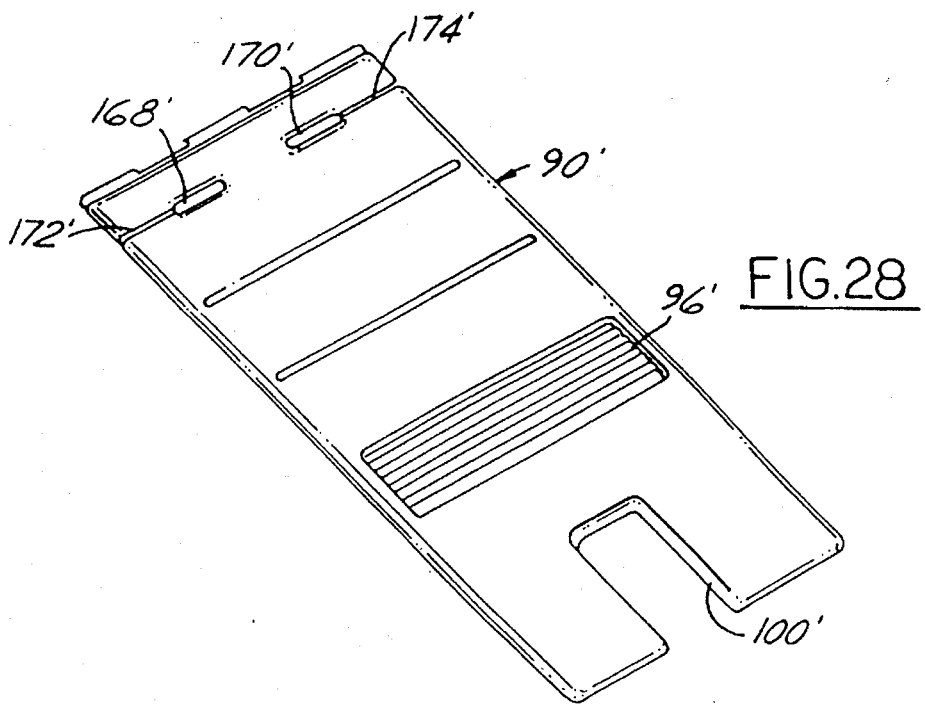
FIG. 28 is a view similar to FIG. 4 showing a modified pad.

FIG. 28 shows an alternate pad 90' covered with suitable cloth or woven material wherein at least the backside portion has a pile-like outer surface adapted for engagement by a suitable hook-type Velcro strip.

As shown in FIG. 9, an outer cloth or other material, such as vinyl or leather, cover 106 is wrapped around the cushion segment 19. A plurality of spaced holes 108 are formed in the plastic seat pad support platform 40 intermediate the trough 46 and the edges of the ledge portion 44. A flat retainer 110 includes a flange 112 formed on the inner edge thereof, and suitable fasteners 114 extend through openings 115 formed at spaced intervals along the center line thereof, and thence through the cover 106 into the seat bottom 19. The fasteners 114 are aligned with, and snap into, the holes 108. The cover 106 is wrapped around the flange 112 and retained thereby when projected into the trough 46, as shown at the left side of FIG. 9.

Mating Velcro strips or other suitable hook and loop tape strips 116a (FIG. 4) and 116b (FIG. 6) are respectively secured to the underside of the seat segment 92 and the upper side of the plastic seat support platform 40, respectively, to hold the seat segment in place. In the case of pad 90', having a cover with a fabric-like pile outer surface, the strips 116a (FIG. 4) are not required, and the strip 116b is a hook-type strip.

After use, and when no toddler is on board, the leg support 20, the cushion segment 19, and the associated support platform 40 are folded up in an arcuate motion to resume the function of being a portion of a normal motor vehicle or aircraft seat back against the back panel 26 between the sides 36 and 38, to complete the seat back structure.

As shown in FIGS. 5–11, the belts 78 and 80 connect through the T-bar 76 (FIG. 6) to the belt 72. The latter extends beneath the plastic support platform 40 and through a front opening 122 and the rear opening 58. It passes through a flat bracket 124 (FIGS. 6 and 11) prior to exiting through the opening 122 (FIGS. 6 and 10), wherein it may be retained in position by a serrated surface 126 (FIG. 10), serving as a tension adjuster on a cross member 128 which is pivotally mounted on a pin 130 (FIG. 11) between oppositely disposed side walls 131 of the bracket 124. A coil spring 132 operatively connected between the cross member 128 and the pin 130 retains the serrated surface 126 in a gripping engagement against the adjust belt 72 until a shoulder adjustment pull strap 134 extending through the front opening 122 is pulled forward to pivot the cross member 128 and thereby release the adjust belt 72 and permit it to be pulled to tighten the shoulder belts 78 and 80 around the child. The pull strap 134 is mounted around a bar 136 connected to forward edges of the cross member 128 by levers 138. A belt tab 140 (FIG. 6) is secured at the end of the adjust belt 72 to facilitate the pulling-to-tighten process.

Figure 24:
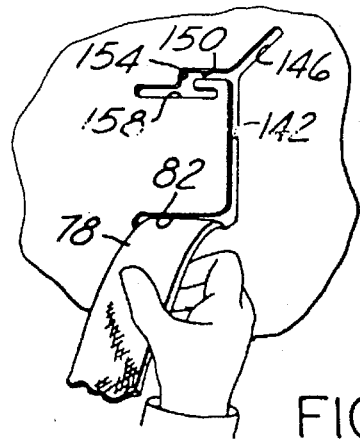
FIGS. 24–27 illustrate the steps involved in the operation of a feature of the invention.
Figure 25:
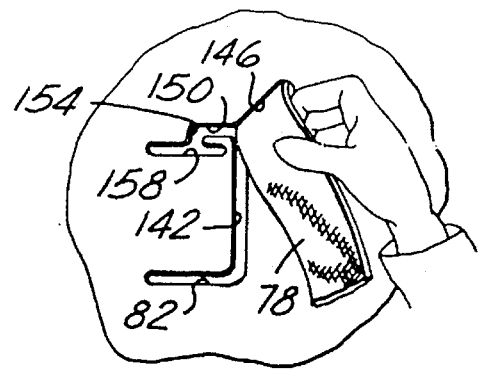
Figure 26:
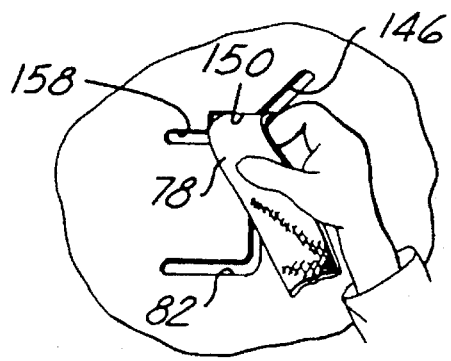
Figure 27:
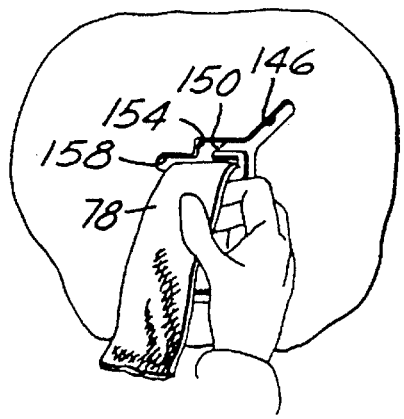

Referring now to FIG. 13 and once again to FIGS. 3 and 5, it is noted that the two restraint slots 82 and 83 communicate at their outwardly disposed ends with the lower ends of two vertical transfer slots 142 and 144 respectively. The vertical transfer slots 142 and 144 communicate at their upper ends with diagonally oriented, upwardly extending inversion slots 146 and 148 respectively and lateral transfer slots 150 and 152 respectively. The lateral transfer slots 150 and 152 extend to respective downward vertical transfer slots 154 and 156 which communicate with two belt restraint slots 158 and 160 respectively between the ends thereof. The two sets of slots are formed in the panel 26 and comprise two horizontally spaced and generally horizontally aligned pairs of vertically spaced belt receiving restraint slots 82 and 158 and 83 and 160 and a transfer slot extending between each pair of restraint slots. The transfer slot which extends between the pair of slots 82 and 158 is provided by the three communicating transfer slots 142, 150 and 154. The transfer slot which extends between the pair of slots 83 and 160 is provided by the three communicating transfer slots 144, 152 and 156. When it is necessary to accommodate a larger child, the twin shoulder belts 78 and 80 are moved out of the pair of restraint slots 82 and 83 respectively (FIG. 24), into the vertical transfer slots 142 and 144 and thence into the diagonal inversion slots 146 and 148 (FIG. 25). The trailing edges of the belts 78 and 80 are then moved progressively through into the lateral transfer slots 150 and 152 (FIG. 26) to the vertical transfer slots 154 and 156 for seating in the upper belt restraint slots 158 and 160 (FIG. 27).

As shown in FIG. 4, the back segment 94 of the pad 90 includes only horizontal slots 168 and 170 and horizontal slits 172 and 174 continuing from the respective slots 168 and 170, to accommodate the adjustment of the belts 78 and 80 into either the lower restraint slots 82 and 83 or the upper restraint slots 158 and 160.

A head support cushion assembly 175 (FIGS. 12 and 14) is pivotally mounted on an inverted J-shaped upper cross bar 176 (FIG. 14) overlying the upper portion of the back panel 26. The head supporting cushion assembly 175 includes foam material 177 covered on the back side thereof with a plastic backing 178 having a substantially C-shaped clamp 179 end portion adapted to flex so as to snap over the upper cross bar 176, as shown in FIG. 14. A cover 180 of a suitable material, such as cloth fabric, covers the front side of the foam material 177 and a portion of the back side of the C-shaped clamp 179. The cover 180 wraps around the lower front end of the foam material 177, to extend along the lower end of the plastic backing 178. A stiffener panel 182 is mounted intermediate the foam material 177 and the portion of the cover 180 adjacent the plastic backing 178, secured by staples or stitches 184, as required, for a purpose to be described. As shown in FIG. 15, snap-in fasteners 186 are formed on the plastic backing 178, so as to be secured to the back panel 26 by snapping through openings 188 formed in the back panel.

As shown in FIGS. 2 and 3, strips of Velcro 39a, or other suitable hook end loop tape strips, are mounted on the back side of the second bolster segment 20, adapted to engage mating Velcro or other suitable strips 39b mounted on the lower front edge of the cover member 180, as shown in FIGS. 14 and 17, to retain the seat back section 18 in its upright position, intermediate the recess side walls 36 and 38.

When the seat back section 18 is down in the child usable position, and it is desirable to change the location of the twin shoulder belts 78 and 80 in the two pair of restraint slots 82/83 and 158/160 (FIG. 5), the lower portion of the close cover assembly is lifted up, bending about a line represented as 189 in FIG. 14, and moving the belts into or out of the slots 168/170 of the pad 90 (FIG. 4) or slots 168'/170' of the pad 90' (FIG. 28) through the respective slits 172/174 or 172'/174'.

Referring now to FIGS. 17–21, the fastening means for securing the back panel 26 to the back wall 30 via the brackets 32 is shown in more detail.

Figure 18:
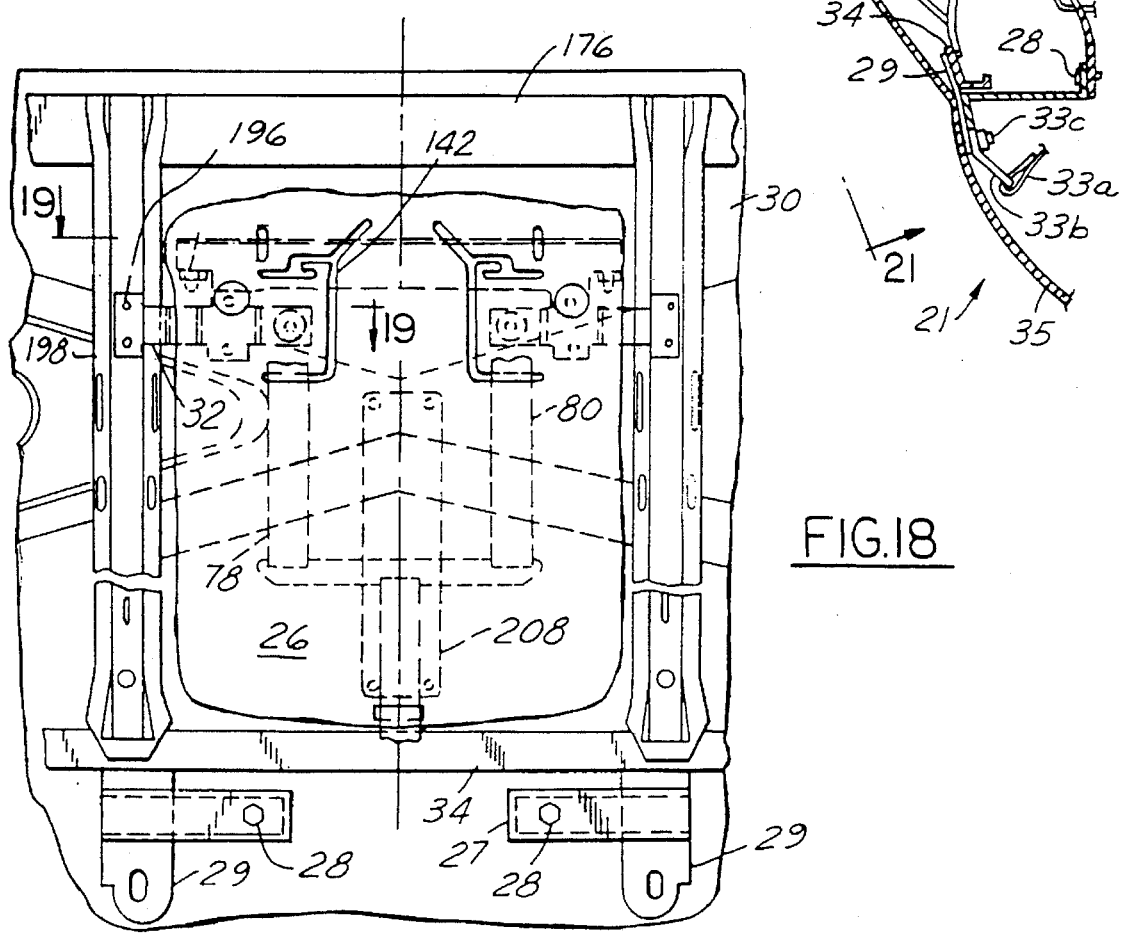
FIG. 18 is a fragmentary view taken along the plane of the line 18—18 of FIG. 17, with portions thereof broken away, and looking in the direction of the arrows.
Figure 21:
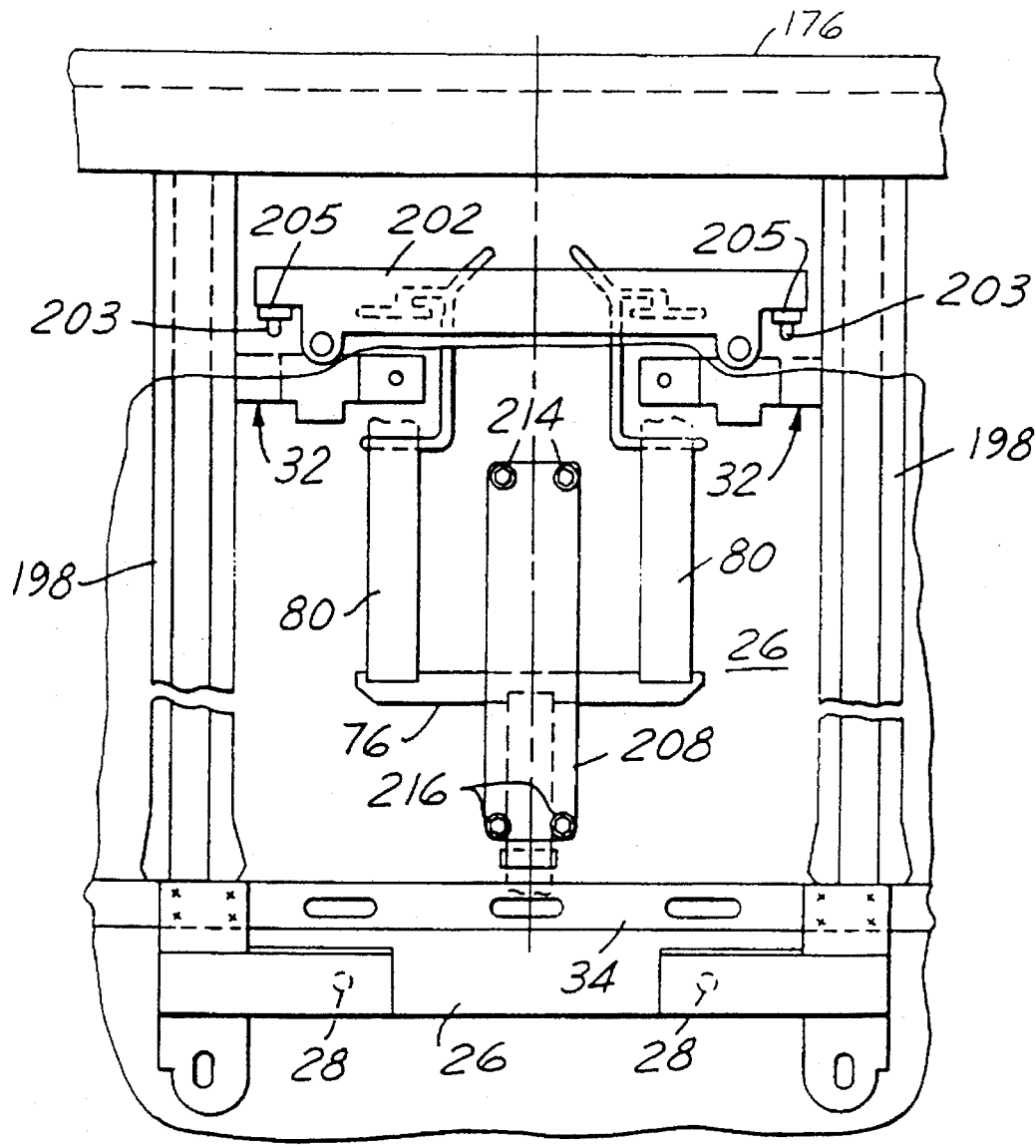
FIG. 21 is a fragmentary view taken along the plane of the lines 21—21 of FIG. 17, with portions thereof broken away, and looking in the direction of the arrows.
Figure 19:
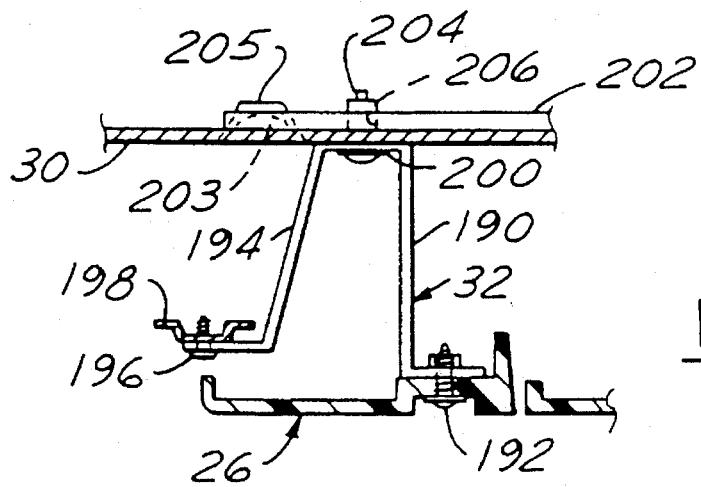
FIG. 19 is a cross sectional view taken along the plane of the line 19—19 of FIG. 18, and looking in the direction of the arrows.

One leg 190 (FIG. 19) of each of two brackets 32 is secured by a suitable fastener 192 to the back panel 26, while the other leg 194 of the bracket is secured by a suitable fastener 196 to respective vertical support members 198 (FIG. 18). As shown in FIGS. 17, 18 and 21, the vertical support members 198 are secured at the lower end thereof to the lower J-bar 34 and at the upper end thereof to the upper inverted J-bar 176. The end portion 200 (FIG. 19) of the bracket 32 is abutted against the inside of the back wall 30, and a backing or mounting plate 202 (FIG. 20) is abutted against the other or rear trunk side of the back wall 30, and secured thereto by suitable fasteners 204. Tabs 203 (FIG. 20) are formed adjacent the ends of the mounting plate 202, for mounting in projections 205 (FIG. 19) formed by punching out back wall 30. Aligned openings 206 (FIG. 20) are formed through the backing or mounting plate 202, such that the fasteners 204 are mounted therethrough (FIG. 19) to complete the securing of the seat back panel 26 to the back wall 30.

A T-bar retention panel 208 (FIGS. 17 and 21) is mounted on upper and lower projections 210 and 212 (FIG. 17) by fasteners 214 and 216 (FIG. 21) on the back of the back panel 26. As shown in FIG. 21, the T-bar 76 is slidably confined between the retention panel 208 and the back panel 26. The single seat belt 72 extends downwardly from the T-bar 76 to exit from the lower end of the panel 208, while the twin shoulder belts 78 and 80 extend upwardly from the T-bar on opposite sides of the panel, to the pair of restraint slots 82/83 or 158/160.

Figure 22:
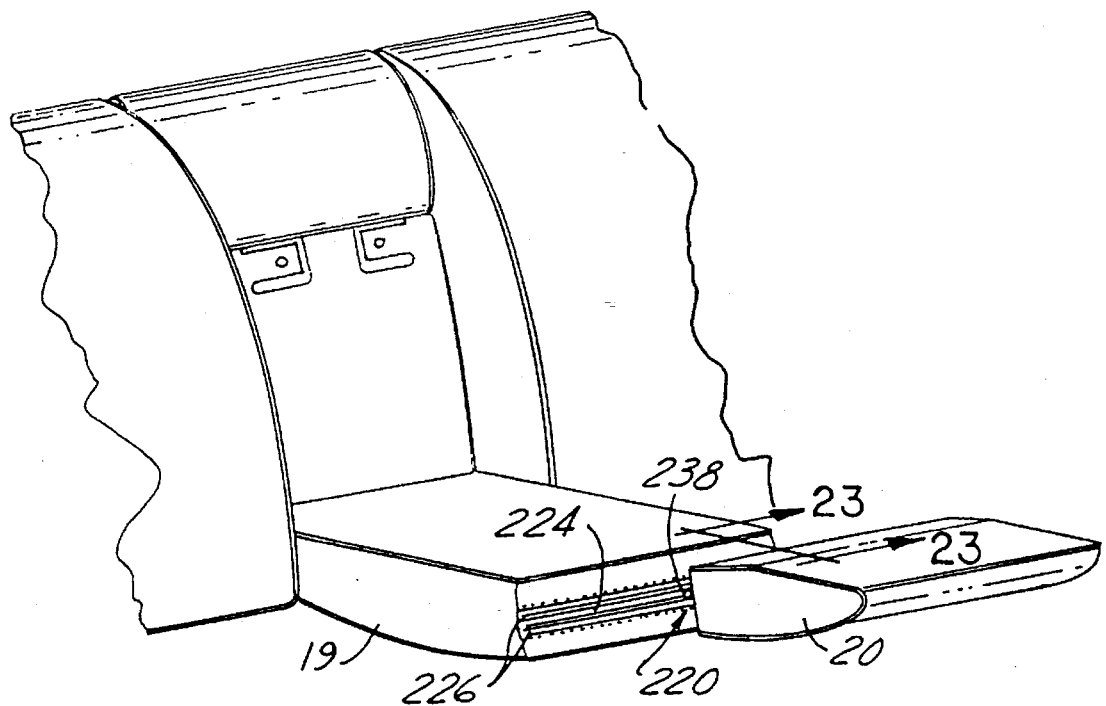
FIG. 22 is a perspective view showing an alternate embodiment of a portion of the invention.
Figure 23:
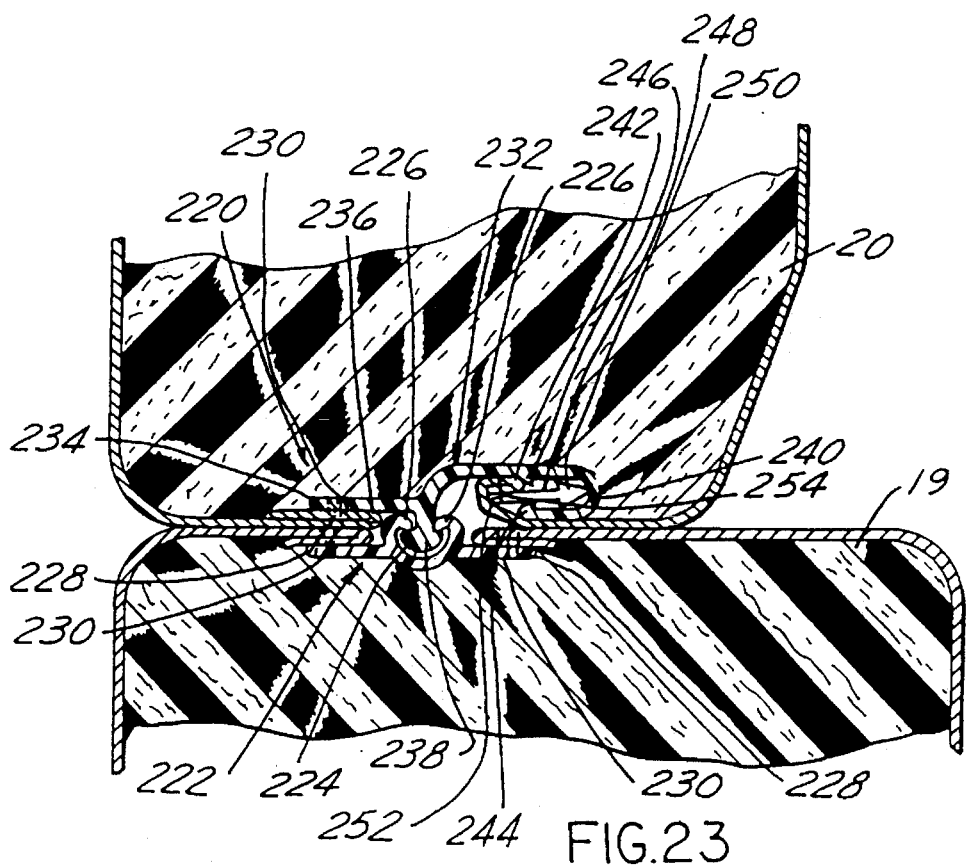
FIG. 23 is an enlarged cross-sectional view taken along the plane of the line 23—23 of FIG. 22, and looking in the direction of the arrows.

Referring now to FIGS. 22 and 23, in lieu of the zipper-type flexible and detachable hinge 21 of FIGS. 3 and 16, a slide fastener assembly 220 is disclosed. The assembly 220 includes a first member 222 having a central U-shaped track 224 with inturned ends 226, and lateral extensions 228 secured by suitable fastener means, such as stitching 230, to folded trim ends of the upper or first bolster segment 19, and a second member 232 secured by stitching 230, or the like, at one edge 234 thereof to a folded trim end 236 of the lower or second bolster segment 20, with a flanged longitudinal protrusion 238 formed at a central location for sliding cooperation with the U-shaped track 224 and inturned ends 226. The second member 232 includes an end 240 opposite the edge 234 which is U-shaped to receive the other folded trim end 242 of the second bolster segment 20. More specifically, an inturned end 244 is formed on the distal end of the U-shaped end 240, with a projection 246 formed on the inner surface of the second member 232 opposite the inturned end 244. An extruded strip 248 having a barb 250 formed on one end thereof is secured at the other end 252 thereof by fastening means, such as stitching 254. As such, the barb 250 is forced through the opening between the inturned end 244 and the projection 246 to secure the folded trim end 242 to the second member 232. With this construction, the flanged protrusion 238 slides through the track 224 to alternately engage and disengage the two bolster segments 19 and 20.

INDUSTRIAL APPLICABILITY

It should be apparent that the invention provides a compact and efficient child restraint system for incorporation as an integrated module of a motor vehicle or aircraft seat structure.

It should also be apparent that, if desired, two such integrated child seat modules could be incorporated in a spaced apart arrangement in the back bench seat structure of a motor vehicle or aircraft.

While but one general embodiment of the invention has been shown and described, other modifications thereof are possible within the scope of the following claims.

What is claimed is:

1. In a vehicle seat integrated to selectively provide an adult seat in an adult seat mode and a child's seat in a child seat mode, said vehicle seat comprising a seat cushion assembly constructed and arranged to be mounted on a vehicle in a position to enable an adult occupant of the vehicle to sit thereon in an operative position, a seat back support assembly constructed and arranged with respect to said seat cushion assembly to be disposed in an operative fixed relation therewith, side cushions carried by said seat back support assembly in positions spaced apart a distance sufficient to define a child receiving space between said side cushions of a size to enable a child to be disposed between said side cushions, a plurality of cushion assemblies mounted on said seat back support assembly including a movable cushion assembly constructed and arranged with respect to said seat back support assembly to be moved between (1) an adult mode position wherein said plurality of cushion assemblies including said movable cushion assembly are disposed within the space between the side cushions and provide therewith a cushioned adult back support for engaging the back of an adult seat occupant sitting on the seat cushion assembly, and (2) a child mode position wherein said movable cushion assembly extends from the space between the side cushions in overlying relation to the seat cushion assembly and said plurality of cushion assemblies including said movable cushion assembly provide a cushioned child's seat extending from the bottom of the space in overlying relation to the seat cushion assembly, a cushioned child's seat back extending upwardly from said cushioned child's seat within the space between said side cushions, and a cushioned child's head support above the cushioned child's seat back, a child's seat belt assembly connected with said seat back support assembly including a pair of shoulder belts extending therefrom forwardly beyond said cushioned child's seat back for extension over the shoulders of a child sitting on said child's seat, said first movable cushion assembly providing a rigid anchor point for the child's seat belt assembly between the legs of a child sitting on said cushioned child's seat, the improvement which comprises said plurality of cushion assemblies including a cushion assembly in the form of a bolster element connected with said movable cushion assembly so as to be moved together with said movable cushion assembly, said bolster element being constructed and arranged with respect to said movable cushion assembly so as to (1) extend above said movable cushion assembly between said side cushions to provide a part of said adult back support when said movable cushion assembly is in the adult mode position thereof and (2) extend forwardly from said movable cushion assembly in overlying supported relation to said seat cushion assembly when said movable cushion assembly is in said child mode position to provide a leg support for a small child sitting on said cushioned child's seat, said bolster element being connected with said movable cushion assembly by a separable slide fastener assembly constructed and arranged to be moved between a connecting position interconnecting said bolster element with said movable cushion assembly and a separable position enabling said bolster element to be selectively removed from said movable cushion assembly.

2. The combination as defined in claim 1 wherein said separable slide fastener assembly is a separable zipper assembly.

3. The combination as defined in claim 1 wherein said separable slide fastener assembly includes a pair of cooperating members fixed to said movable cushion assembly and to said bolster element respectively, a first of said pair of cooperating members comprising a trough member of generally U-shaped cross-sectional configuration, a second of said pair of cooperating members having a flanged longitudinal protrusion constructed and arranged to detachably slidably engage within the U-shape of said trough member.

4. The combination as defined in claim 1 wherein said plurality of cushion assemblies includes a removable cushion pad assembly having a seat section, one or more hook fastener sections on said movable cushion assembly and one or more cooperating loop connections on the seat section of said removable cushion pad assembly, said one or more hook fastener sections and said cooperating loop connections being constructed and arranged to detachably retain the seat section of said removable cushion pad assembly with said movable cushion assembly so as to be moved therewith, said removable cushion pad assembly being constructed of a first cloth material on an exterior side thereof defining the upper layer of the cushioned child's seat and being constructed of a second cloth material on an opposite side to said exterior side, the improvement which comprises said one or more cooperating loop connections comprising the second cloth material having a pile-like outer surface extending substantially throughout said opposite side of said seat section providing loops detachably engageable by said one or more hook fastener sections.

5. The combination as defined in claim 4 wherein the removable cushion pad assembly of the vehicle seat includes a back section hingedly connected to said seat section along a fold line, one or more hook fastener sections on said seat back support assembly and one or more cooperating loop connections on said back section and wherein said improvement further comprises said one or more cooperating loop connections on said back section comprising the second cloth material having a pile-like outer surface extending substantially throughout said opposite side of said back section to be detachably engageable by the one or more hook fastener sections fixed to said seat back support assembly.

6. The combination as defined in claim 1 wherein said seat back support assembly includes seat back support structure and a rigid back panel of a size to fit within the space between said side cushions, said rigid back panel being connected with said seat back support structure forwardly thereof.

7. The combination as defined in claim 6 wherein said rigid back panel has a number of slots therein constructed and arranged to enable the pair of shoulder belts of said child's seat belt assembly to be conveniently moved into a plurality of vertically spaced positions with respect to said child's seat back to selectively accommodate a relatively small child or a relatively large child by manually grasping the shoulder belts extending forwardly of said cushioned child's seat back and moving them selectively into one of said plurality of vertically spaced positions, said plurality of slots including two horizontally spaced and generally horizontally aligned pairs of vertically spaced belt receiving restraint slots formed in said rigid back panel and a transfer slot extending between the restraint slots of each pair so as to define a cantilevered portion in said rigid back panel between the associated pair of restraint slots, said seat back support structure including a rigid bracket connected directly with each cantilevered portion, each of said brackets being constructed and arranged to provide support from said seat back support structure directly to the cantilevered portion connected therewith while allowing the associated shoulder belt to be selectively moved within the associated transfer slot between the associated pair of restraint slots.

8. The combination as defined in claim 7 wherein an upper restraint slot of each pair of restraint slots has the transfer slot associated therewith extending in communicating relation therewith upwardly therefrom between the ends thereof and laterally beyond one of the ends thereof and then generally downwardly beyond said upper restraint slot in laterally spaced relation to said upper restraint slot into communicating relation with a lower restraint slot of the pair.

9. The combination as defined in claim 8 wherein said number of slots further includes an inversion slot associated with each transfer slot, each inversion slot having a closed inlet end and an opposite end communicating with the associated transfer slot and being of a length sufficient to enable the associated belt to be moved therein through said opposite end with one edge of said belt leading and to be moved outwardly thereof through said opposite end with an opposite edge of said belt leading so as to enable said belt to be moved into each restraint slot of the associated pair of restraint slots with the edges thereof oriented the same with respect to each restraint slot.

10. The combination as defined in claim 9 wherein said plurality of cushion assemblies includes a head support cushion assembly fixed to an upper portion of said rigid back panel between said side cushions, said head support cushion assembly being constructed and arranged to provide said cushioned child's head support when said movable cushion assembly is in the child mode position thereof, and wherein the improvement further comprises said head support cushion assembly being detachably fixedly connected at a lower portion thereof with the upper portion of the rigid back panel by detachable fasteners carried by said head support cushion assembly and detachably connected with said rigid back panel, an upper portion of said head support cushion assembly having a C-shaped clamp connected therewith and with a cross member forming a part of the seat back support structure.

11. The combination as defined in claim 10 wherein said plurality of cushion assemblies includes a removable cushion pad assembly having a seat section, one or more hook fastener sections on said movable cushion assembly and one or more cooperating loop connections on said seat section, said one or more hook fastener sections and said cooperating loop connections being constructed and arranged to detachably retain the seat section of said removable cushion pad assembly with said movable cushion assembly so as to be moved therewith, said removable cushion pad assembly being constructed of a first cloth material on an exterior side thereof defining the upper layer of the cushioned child's seat and being constructed of a second cloth material on an opposite side to said exterior side, the improvement which comprises said one or more cooperating loop connections comprising the second cloth material having a pile-like outer surface extending substantially throughout said opposite side of said seat section providing loops detachably engageable by said one or more hook fastener sections.

12. The combination as defined in claim 11 wherein the removable cushion pad assembly of the vehicle seat includes a back section hingedly connected to said seat section along a fold line, one or more hook fastener sections on said rigid back panel and one or more cooperating loop connections on said back section and wherein said improvement further comprises said one or more cooperating loop connections on said back section comprising the second cloth material having a pile-like outer surface extending substantially throughout said opposite side of said back section to be detachably engageable by the one or more hook fastener sections fixed to said rigid back panel.

13. The combination as defined in claim 6 wherein said rigid back panel has a number of slots therein constructed and arranged to enable the pair of shoulder belts of said child's seat belt assembly to be conveniently moved into a plurality of vertically spaced positions with respect to said child's seat back to selectively accommodate a relatively small child or a relatively large child by manually grasping the shoulder belts extending forwardly of said cushioned child's seat back and moving them selectively into one of said plurality of vertically spaced positions, said number of slots including two horizontally spaced and generally horizontally aligned pairs of vertically spaced belt receiving restraint slots formed in said rigid back panel and a transfer slot associated with each pair of restraint slots, an upper restraint slot of each pair of restraint slots having one end of the transfer slot associated therewith disposed in communicating relation therewith between the ends thereof, each transfer slot extending upwardly from said one end thereof and laterally beyond one of the ends of the associated upper restraint slot and then generally downwardly beyond the associated upper restraint slot in laterally spaced relation to the associated upper restraint slot into communicating relation at an opposite end thereof with a lower restraint slot of the associated pair of restraint slots.

14. The combination as defined in claim 13 wherein said number of slots further includes an inversion slot associated with each transfer slot, each inversion slot having a closed inlet end and an opposite end communicating with the associated transfer slot and being of a length sufficient to enable the associated belt to be moved therein through said opposite end with one edge of said belt leading and to be moved outwardly thereof through said opposite end with an opposite edge of said belt leading so as to enable said belt to be moved into each restraint slot of the associated pair of restraint slots with the edges thereof oriented the same with respect to each restraint slot.

15. The combination as defined in claim 6 wherein said plurality of cushion assemblies including a head support cushion assembly fixed to an upper portion of said rigid back panel between said side cushions, said head support cushion assembly being constructed and arranged to provide said cushioned child's head support when said movable cushion assembly is in the child mode position thereof, and wherein the improvement further comprises said head support cushion assembly being detachably fixedly connected at a lower portion thereof with the upper portion of the rigid back panel by detachable fasteners carried by said head support cushion assembly and detachably connected with said rigid back panel, an upper portion of said head support cushion assembly having a C-shaped clamp connected therewith and with a cross member forming a part of the seat back support structure.

16. In a vehicle seat integrated to selectively provide an adult seat in an adult seat mode and a child's seat in a child seat mode, said vehicle seat comprising a seat cushion assembly constructed and arranged to be mounted on a vehicle in a position to enable an adult occupant of the vehicle to sit thereon in an operative position, a seat back support assembly mounted with respect to said seat cushion assembly so to be disposed in an operative fixed relation therewith, side cushions carried by said seat back support assembly in positions spaced apart a distance sufficient to define a child receiving space between said side cushions of a size to enable a child to be disposed between said side cushions, a plurality of cushion assemblies mounted on said seat back support assembly including a movable cushion assembly constructed and arranged with respect to said seat back support assembly to be moved between (1) an adult mode position wherein said plurality of cushion assemblies including said movable cushion assembly are disposed within the space between the side cushions and provide therewith a cushioned adult back support for engaging the back of an adult seat occupant sitting on the seat cushion assembly, and (2) a child mode position wherein said movable cushion assembly extends from the space between the side cushions in overlying relation to the seat cushion assembly and said plurality of cushion assemblies including said movable cushion assembly provide a cushioned child's seat extending from the bottom of the space in overlying relation to the seat cushion assembly, a cushioned child's seat back extending upwardly from said cushioned child's seat within the space between said side cushions, and a cushioned child's head support above the cushioned child's seat back, said movable cushion assembly including a frame structure constructed and arranged to extend generally forwardly from a lower portion of the seat back support assembly when said movable cushion assembly is in the child mode position thereof, a structural connection between said frame structure and said seat back support assembly constructed and arranged to enable said movable cushion assembly to be moved between said adult mode and child mode positions, said movable cushion assembly including cushioning material attached to said frame structure in a position to be disposed (1) generally beneath said frame structure when said movable cushion assembly is in said child mode position and (2) generally forwardly of said frame structure between said side cushions when said movable cushion assembly is in said adult mode position, said plurality of cushion assemblies including a removable cushion pad assembly having a seat section, one or more hook fastener sections on said movable cushion assembly and one or more cooperating loop connections on said seat section, said one or more hook fastener sections and said cooperating loop connections being constructed and arranged to detachably retain said seat section of said removable cushion pad assembly with said movable cushion assembly so as to be moved therewith between a position generally between the seat back support assembly and the frame structure of said movable cushion assembly when said movable cushion assembly is in the adult mode position thereof and a position in generally overlying relation to the frame structure of said movable cushion assembly when said movable cushion assembly is in the child mode position thereof, and a child's seat belt assembly constructed and arranged to be operable when said movable seat assembly is in the child mode position thereof to be manually moved between (1) a restraint condition enabling a child in a sitting position on said cushioned child's seat to be restrained thereby and (2) a released condition enabling (A) entry of a child into a sitting position on said cushioned child's seat preparatory to restraint or (B) exit of a child from a sitting position on said cushioned child's seat after restraint, said child's seat belt assembly when in said restraint condition with respect to a child in a sitting position on said cushioned child's seat extending downwardly between the legs of the child to a restraint point provided by said frame structure and including a pair of shoulder belts extending from said seat back support assembly over the shoulders of a child in sitting position on said cushioned child's seat, the seat section of said removable cushion pad assembly constituting an upper layer of said cushioned child's seat when said movable cushion assembly is in the child mode position thereof and being constructed and arranged to allow said child's seat belt assembly to be moved into said restraint condition wherein the child's seat belt assembly extends downwardly between the legs of a child in a sitting position on the seat section of said removable cushion pad assembly to the restraint point provided by said frame structure, said removable cushion pad assembly being constructed of a first cloth material on an exterior side thereof defining the upper layer of the cushioned child's seat and being constructed of a second cloth material on an opposite side to said exterior side, the improvement which comprises said one or more cooperating loop connections comprising the second cloth material itself, said second cloth material having a pile-like outer surface extending substantially throughout said opposite side of said seat section providing loops detachably engageable by said one or more hook fastener sections.

17. The combination as defined in claim 16 wherein the removable cushion pad assembly of the vehicle seat includes a back section hingedly connected to said seat section along a fold line, one or more hook fastener sections on said seat back support assembly and one or more cooperating loop connections on said back section and wherein said improvement further comprises said one or more cooperating loop connections on said back section comprising the second cloth material having a pile-like outer surface extending substantially throughout said opposite side of said back section providing loops detachably engageable by the one or more hook fastener sections fixed to said seat back support assembly.

18. In a vehicle seat integrated to selectively provide an adult seat in an adult seat mode and a child's seat in a child seat mode, said vehicle seat comprising a seat cushion assembly constructed and arranged to be mounted on a vehicle in a position to enable an adult occupant of the vehicle to sit thereon in an operative position, a seat back support assembly constructed and arranged with respect to said seat cushion assembly to be disposed in an operative fixed relation therewith, side cushions carried by said seat back support assembly in positions spaced apart a distance sufficient to define a child receiving space between said side cushions of a size to enable a child to be disposed between said side cushions, a plurality of cushion assemblies mounted on said seat back support assembly including a movable cushion assembly constructed and arranged with respect to said seat back support assembly to be moved between (1) an adult mode position wherein said plurality of cushion assemblies including said movable cushion assembly are disposed within the space between the side cushions and provide therewith a cushioned adult back support for engaging the back of an adult seat occupant sitting on the seat cushion assembly, and (2) a child mode position wherein said movable cushion assembly extends from the space between the side cushions in overlying relation to the seat cushion assembly and said plurality of cushion assemblies including said movable cushion assembly provide a cushioned child's seat extending from the bottom of the space in overlying relation to the seat cushion assembly, a cushioned child's seat back extending upwardly from said cushioned child's seat within the space between said side cushions, and a cushioned child's head support above the cushioned child's seat back, a child's seat belt assembly connected with said seat back support assembly including a pair of shoulder belts extending therefrom forwardly beyond said cushioned child's seat back for extension over the shoulders of a child sitting on said child's seat, said first movable cushion assembly providing a rigid anchor point for the child's seat belt assembly between the legs of a child sitting on said cushioned child's seat, said seat back support assembly including a seat back support structure and a rigid back panel of a size to fit within the space between said side cushions, said rigid back panel being connected with said seat back support structure forwardly thereof, the improvement which comprises said rigid back panel having a number of slots therein constructed and arranged to enable the pair of shoulder belts of said child's seat belt assembly to be conveniently moved into a plurality of vertically spaced positions with respect to said child's seat back to selectively accommodate a relatively small child or a relatively large child by manually grasping the shoulder belts extending forwardly of said cushioned child's seat back and moving them selectively into one of said plurality of vertically spaced positions, said plurality of slots including two horizontally spaced and generally horizontally aligned pairs of vertically spaced belt receiving restraint slots formed in said rigid back panel and a transfer slot extending between the restraint slots of each pair so as to define a cantilevered portion in said rigid back panel between the associated pair of restraint slots, said seat back support structure including a rigid bracket connected directly with each cantilevered portion, each of said brackets being constructed and arranged to provide support from said seat back support structure directly to the cantilevered portion connected therewith while allowing the associated shoulder belt to be selectively moved within the associated transfer slot between the associated pair of restraint slots.

19. The combination as defined in claim 18 wherein an upper restraint slot of each pair of restraint slots has the transfer slot associated therewith extending in communicating relation therewith upwardly therefrom between the ends thereof and laterally beyond one of the ends thereof and then generally downwardly beyond said upper restraint slot in laterally spaced relation to said upper restraint slot into communicating relation with a lower restraint slot of the pair.

20. The combination as defined in claim 19 wherein said number of slots further includes an inversion slot associated with each transfer slot, each inversion slot having a closed inlet end and an opposite end communicating with the associated transfer slot and being of a length sufficient to enable the associated belt to be moved therein through said opposite end with one edge of said belt leading and to be moved outwardly thereof through said opposite end with an opposite edge of said belt leading so as to enable said belt to be moved into each restraint slot of the associated pair of restraint slots with the edges thereof oriented the same with respect to each restraint slot.

21. The combination as defined in claim 18 wherein said plurality of cushion assemblies including a head support cushion assembly fixed to an upper portion of said rigid back panel between said side cushions, said head support cushion assembly being constructed and arranged to provide said cushioned child's head support when said movable cushion assembly is in the child mode position thereof, and wherein the improvement further comprises said head support cushion assembly being detachably fixedly connected at a lower portion thereof with the upper portion of the rigid back panel by detachable fasteners carried by said head support cushion assembly and detachably connected with said rigid back panel, an upper portion of said head support cushion assembly having a C-shaped clamp connected therewith and with a cross member forming a part of the seat back support structure.

22. In a vehicle seat integrated to selectively provide an adult seat in an adult seat mode and a child's seat in a child seat mode, said vehicle seat comprising a seat cushion assembly constructed and arranged to be mounted on a vehicle in a position to enable an adult occupant of the vehicle to sit thereon in an operative position, a seat back support assembly constructed and arranged with respect to said seat cushion assembly to be disposed in an operative fixed relation therewith, side cushions carried by said seat back support assembly in positions spaced apart a distance sufficient to define a child receiving space between said side cushions of a size to enable a child to be disposed between said side cushions, a plurality of cushion assemblies mounted on said seat back support assembly including a movable cushion assembly constructed and arranged with respect to said seat back support assembly to be moved between (1) an adult mode position wherein said plurality of cushion assemblies including said movable cushion assembly are disposed within the space between the side cushions and provide therewith a cushioned adult back support for engaging the back of an adult seat occupant sitting on the seat cushion assembly, and (2) a child mode position wherein said movable cushion assembly extends from the space between the side cushions in overlying relation to the seat cushion assembly and said plurality of cushion assemblies including said movable cushion assembly provide a cushioned child's seat extending from the bottom of the space in overlying relation to the seat cushion assembly, a cushioned child's seat back extending upwardly from said cushioned child's seat within the space between said side cushions, and a cushioned child's head support above the cushioned child's seat back, a child's seat belt assembly connected with said seat back support assembly including a pair of shoulder belts extending therefrom forwardly beyond said cushioned child's seat back for extension over the shoulders of a child sitting on said child's seat, said first movable cushion assembly providing a rigid anchor point for the child's seat belt assembly between the legs of a child sitting on said cushioned child's seat, said seat back support assembly including a seat back support structure and a rigid back panel of a size to fit within the space between said side cushions, said rigid back panel being connected with said seat back support structure forwardly thereof, the improvement which comprises said rigid back panel having a number of slots therein constructed and arranged to enable the pair of shoulder belts of said child's seat belt assembly to be conveniently moved into a plurality of vertically spaced positions with respect to said child's seat back to selectively accommodate a relatively small child or a relatively large child by manually grasping the shoulder belts extending forwardly of said cushioned child's seat back and moving them selectively into one of said plurality of vertically spaced positions, said number of slots including two horizontally spaced and generally horizontally aligned pairs of vertically spaced belt receiving restraint slots formed in said rigid back panel and a transfer slot associated with each pair of restraint slots, an upper restraint slot of each pair of restraint slots having one end of the transfer slot associated therewith disposed in communicating relation therewith between the ends thereof, each transfer slot extending upwardly from said one end thereof and laterally beyond one of the ends of the associated upper restraint slot and then generally downwardly beyond the associated upper restraint slot in laterally spaced relation to the associated upper restraint slot into communicating relation at an opposite end thereof with a lower restraint slot of the associated pair of restraint slots.

23. The combination as defined in claim 22 wherein said number of slots further includes an inversion slot associated with each transfer slot, each inversion slot having a closed inlet end and an opposite end communicating with the associated transfer slot and being of a length sufficient to enable the associated belt to be moved therein through said opposite end with one edge of said belt leading and to be moved outwardly thereof through said opposite end with an opposite edge of said belt leading so as to enable said belt to be moved into each restraint slot of the associated pair of restraint slots with the edges thereof oriented the same with respect to each restraint slot.

24. In a vehicle seat integrated to selectively provide an adult seat in an adult seat mode and a child's seat in a child seat mode, said vehicle seat comprising a seat cushion assembly constructed and arranged to be mounted on a vehicle in a position to enable an adult occupant of the vehicle to sit thereon in an operative position, a seat back support assembly constructed and arranged with respect to said seat cushion assembly to be disposed in an operative fixed relation therewith, side cushions carried by said seat back support assembly in positions spaced apart a distance sufficient to define a child receiving space between said side cushions of a size to enable a child to be disposed between said side cushions, a plurality of cushion assemblies mounted on said seat back support assembly including a movable cushion assembly constructed and arranged with respect to said seat back support assembly to be moved between (1) an adult mode position wherein said plurality of cushion assemblies including said movable cushion assembly are disposed within the space between the side cushions and provide therewith a cushioned adult back support for engaging the back of an adult seat occupant sitting on the seat cushion assembly, and (2) a child mode position wherein said movable cushion assembly extends from the space between the side cushions in overlying relation to the seat cushion assembly and said plurality of cushion assemblies including said movable cushion assembly provide a cushioned child's seat extending from the bottom of the space in overlying relation to the seat cushion assembly, a cushioned child's seat back extending upwardly from said cushioned child's seat within the space between said side cushions, and a cushioned child's head support above the cushioned child's seat back, a child's seat belt assembly connected with said seat back support assembly including a pair of shoulder belts extending therefrom forwardly beyond said cushioned child's seat back for extension over the shoulders of a child sitting on said child's seat, said first movable cushion assembly providing a rigid anchor point for the child's seat belt assembly between the legs of a child sitting on said cushioned child's seat, said seat back support assembly including a seat back support structure and a rigid back panel of a size to fit within the space between said side cushions, said rigid back panel being connected with said seat back support structure forwardly thereof, said plurality of cushion assemblies including a head support cushion assembly fixed to an upper portion of said rigid back panel between said side cushions, said head support cushion assembly being constructed and arranged to provide said cushioned child's head support when said movable cushion assembly is in the child mode position thereof, the improvement which comprises said head support cushion assembly being detachably fixedly connected at a lower portion thereof with the upper portion of the rigid back panel by detachable fasteners carried by said head support cushion assembly and detachably connected with said rigid back panel, an upper portion of said head support cushion assembly having a C-shaped clamp connected therewith and with a cross member forming a part of the seat back support structure.

25. The combination as defined in claim 24 wherein said rigid back panel has a number of slots therein constructed and arranged to enable the pair of shoulder belts of said child's seat belt assembly to be conveniently moved into a plurality of vertically spaced positions with respect to said child's seat back to selectively accommodate a relatively small child or a relatively large child by manually grasping the shoulder belts extending forwardly of said cushioned child's seat back and moving them selectively into one of said plurality of vertically spaced positions, said plurality of slots including two horizontally spaced and generally horizontally aligned pairs of vertically spaced belt receiving restraint slots formed in said rigid back panel and a transfer slot associated with each pair of restraint slots, an upper restraint slot of each pair of restraint slots having the transfer slot associated therewith extending in communicating relation therewith upwardly therefrom between the ends thereof and laterally beyond one of the ends thereof and then generally downwardly beyond said upper restraint slot in laterally spaced relation to said upper restraint slot into communicating relation with a lower restraint slot of the pair, a lower portion of said head support cushion assembly being detachably fixed to the upper portion of said rigid back panel in a position directly above the upper restraint slots in a position to cover portions of the associated transfer slots extending thereabove.

26. In a vehicle seat integrated to selectively provide an adult seat in an adult seat mode and a child's seat in a child seat mode, said vehicle seat comprising a seat cushion assembly constructed and arranged to be mounted on a vehicle in a position to enable an adult occupant of the vehicle to sit thereon in an operative position, a seat back support assembly mounted with respect to said seat cushion assembly so to be disposed in an operative fixed relation therewith, side cushions carried by said seat back support assembly in positions spaced apart a distance sufficient to define a child receiving space between said side cushions of a size to enable a child to be disposed between said side cushions, a plurality of cushion assemblies mounted on said seat back support assembly including a movable cushion assembly constructed and arranged with respect to said seat back support assembly to be moved between (1) an adult mode position wherein said plurality of cushion assemblies including said movable cushion assembly are disposed within the space between the side cushions and provide therewith a cushioned adult back support for engaging the back of an adult seat occupant sitting on the seat cushion assembly, and (2) a child mode position wherein said movable cushion assembly extends from the space between the side cushions in overlying relation to the seat cushion assembly and said plurality of cushion assemblies including said movable cushion assembly provide a cushioned child's seat extending from the bottom of the space in overlying relation to the seat cushion assembly, a cushioned child's seat back extending upwardly from said cushioned child's seat within the space between said side cushions, and a cushioned child's head support above the cushioned child's seat back, said movable cushion assembly including a frame structure constructed and arranged to extend generally forwardly from a lower portion of the seat back support assembly when said movable cushion assembly is in the child mode position thereof, a structural connection between said frame structure and said seat back support assembly constructed and arranged to enable said movable cushion assembly to be moved between said adult mode and child mode positions, said movable cushion assembly including cushioning material attached to said frame structure in a position to be disposed (1) generally beneath said frame structure when said movable cushion assembly is in said child mode position and (2) generally forwardly of said frame structure between said side cushions when said movable cushion assembly is in said adult mode position, said plurality of cushion assemblies including a removable cushion pad assembly having a seat section, one or more hook fastener sections on said movable cushion assembly and one or more cooperating loop connections on said seat section, said one or more hook fastener sections and said cooperating loop connections being constructed and arranged to detachably retain said seat section of said removable cushion pad assembly with said movable cushion assembly so as to be moved therewith between a position generally between the seat back support assembly and the frame structure of said movable cushion assembly when said movable cushion assembly is in the adult mode position thereof and a position in generally overlying relation to the frame structure of said movable cushion assembly when said movable cushion assembly is in the child mode position thereof, and a child's seat belt assembly constructed and arranged to be operable when said movable seat assembly is in the child mode position thereof to be manually moved between (1) a restraint condition enabling a child in a sitting position on said cushioned child's seat to be restrained thereby and (2) a released condition enabling (A) entry of a child into a sitting position on said cushioned child's seat preparatory to restraint or (B) exit of a child from a sitting position on said cushioned child's seat after restraint, said child's seat belt assembly when in said restraint condition with respect to a child in a sitting position on said cushioned child's seat extending downwardly between the legs of the child to a restraint point provided by said frame structure and including a pair of shoulder belts extending from said seat back support assembly over the shoulders of a child in sitting position on said cushioned child's seat, the seat section of said removable cushion pad assembly constituting an upper layer of said cushioned child's seat when said movable cushion assembly is in the child mode position thereof and being constructed and arranged to allow said child's seat belt assembly to be moved into said restraint condition wherein the child's seat belt assembly extends downwardly between the legs of a child in a sitting position on the seat section of said removable cushion pad assembly to the restraint point provided by said frame structure, said removable cushion pad assembly being constructed of a first cloth material on an exterior side thereof defining the upper layer of the cushioned child's seat and being constructed of a second cloth material on an opposite side to said exterior side, the improvement which comprises said one or more cooperating loop connections being provided as an integral part of the second cloth material itself, said second cloth material being devoid of one or more separate sections affixed thereto which provide loop connections, said second cloth material having an integral pile-like outer surface extending substantially throughout said opposite side of said seat section, said integral pile-like outer surface including loops providing said one or more loop connections detachably engageable by said one or more hook fastener sections.

27. The combination as defined in claim 26 wherein the removable cushion pad assembly of the vehicle seat includes a back section hingedly connected to said seat section along a fold line, one or more hook fastener sections on said seat back support assembly and one or more cooperating loop connections on said back section and wherein said improvement further comprises said one or more cooperating loop connections on said back section comprising the second cloth material having a pile-like outer surface extending substantially throughout said opposite side of said back section providing loops detachably engageable by the one or more hook fastener sections fixed to said seat back support assembly.

28. The combination as defined in claim 26 wherein said loops occupy an area of said pile-like outer surface which is substantially greater than the area occupied by said hook fastener sections.

29. The combination as defined in claim 27 wherein said loops occupy an area of said pile-like outer surface which is substantially greater than the area occupied by said hook fastener sections.

30. The combination as claimed in claim 27, wherein said seat section and said back section are hingedly connected along an integral hinge portion generally defining said fold line, said hinge portion having an average thickness less than an average thickness of said seat section and said back section.

31. The combination as claimed in claim 26, wherein said first cloth material and said second cloth material have a substantially identical peripheral shape.

* * * * *